United States Patent
Miyata et al.

(10) Patent No.: US 12,314,630 B2
(45) Date of Patent: May 27, 2025

(54) PLACE INFORMATION MANAGEMENT DEVICE, CONTENT DELIVERY SYSTEM, AND PLACE INFORMATION MANAGEMENT METHOD

(71) Applicant: HONDA MOTOR CO., LTD., Tokyo (JP)

(72) Inventors: Takashi Miyata, Tokyo (JP); Taiki Yamada, Tokyo (JP); Tomoaki Hagihara, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 314 days.

(21) Appl. No.: 18/177,209

(22) Filed: Mar. 2, 2023

(65) Prior Publication Data

US 2023/0289129 A1 Sep. 14, 2023

(30) Foreign Application Priority Data

Mar. 11, 2022 (JP) .................................. 2022-037930

(51) Int. Cl.
*G06F 3/16* (2006.01)
*G06V 20/30* (2022.01)

(52) U.S. Cl.
CPC .............. *G06F 3/165* (2013.01); *G06V 20/30* (2022.01)

(58) Field of Classification Search
CPC ................. G06F 3/165; G06V 20/30
See application file for complete search history.

(56) References Cited

U.S. PATENT DOCUMENTS

2017/0092247 A1* 3/2017 Silverstein ............. G06N 20/00
2020/0243055 A1* 7/2020 Grace ................... H04L 67/131
2024/0273981 A1* 8/2024 Takeda ..................... G08B 6/00

FOREIGN PATENT DOCUMENTS

JP 2001-189969 A 7/2001
JP 2012-123488 A 6/2012

* cited by examiner

*Primary Examiner* — Fan S Tsang
*Assistant Examiner* — David Siegel
(74) *Attorney, Agent, or Firm* — Rankin, Hill & Clark LLP

(57) ABSTRACT

A place information management device includes: a place information storage section storing place information, in association with a place, which is information about the place and which includes first emotion information about an emotion that can be felt by a person in the place; a shooting position acquisition section acquiring a shooting position of a shot image by a shooting device; a music information acquisition section acquiring music information which is information on music to be reproduced in time to display of the shot image and which includes second emotion information about an emotion that can be felt by a person listening to the music; and a place information generation and update section generating or updating the first emotion information about a place corresponding to the shooting position, based on the second emotion information, and storing the first emotion information in the place information storage section.

10 Claims, 8 Drawing Sheets

PLACE INFORMATION MANAGEMENT DEVICE, CONTENT DELIVERY SYSTEM, AND PLACE INFORMATION MANAGEMENT METHOD

INCORPORATION BY REFERENCE

The present application claims priority under 35 U.S.C. § 119 to Japanese Patent Application No. 2022-037930 filed on Mar. 11, 2022. The content of the application is incorporated herein by reference in its entirety.

BACKGROUND OF THE INVENTION

Field of the Invention

The present invention relates to a place information management device, a content delivery system, and a place information management method.

Description of the Related Art

There has been known a service of delivering music to a user riding in a vehicle. In such type of services, it also has been known that a piece of music to be delivered is selected based on a position where a vehicle is traveling, thereby delivering the piece of music that is suitable for the then place (for example, see Japanese Patent Laid-Open No. 2001-189969 and Japanese Patent Laid-Open No. 2012-123488).

To select suitable music for a place, information serving as an index of music selection needs to be associated with places beforehand. However, if accuracy of such information is insufficient, unsuitable music for a place can be selected.

An object of the present invention is to provide a place information management device, a content delivery system, and a place information management method that can increase accuracy of information about a place.

SUMMARY OF THE INVENTION

An aspect of the present invention is a place information management device including: a place information storage section that stores place information in association with a place, the place information being information about the place and including first emotion information about an emotion that can be felt by a person who is present in the place; a shooting position acquisition section that acquires a shooting position of a shot image shot by a shooting device; a music information acquisition section that acquires music information that is information on a piece of music to be reproduced in time to display of the shot image, the music information including second emotion information about an emotion that can be felt by a person who listens to the piece of music; and a place information generation and update section that generates the first emotion information, or updates the first emotion information, about a place corresponding to the shooting position, based on the second emotion information in the music information, and stores the first emotion information in the place information storage section.

An aspect of the present invention is the place information management device, further including a shooting time information acquisition section that acquires shooting time information including information on at least any one of a date and a time of day when the shot image is shot, wherein the place information generation and update section classifies the second emotion information, based on the shooting time information, generates the first emotion information, or updates the first emotion information, about the place corresponding to the shooting position, based on the second emotion information after classified, and stores the first emotion information in the place information storage section in association with a time based on the shooting time information.

An aspect of the present invention is the place information management device, wherein when the place corresponding to the shooting position is a predetermined place, the place information generation and update section generates the first emotion information, or updates the first emotion information, about the place corresponding to the shooting position, based on the second emotion information in the music information, and stores the first emotion information in the place information storage section.

An aspect of the present invention is the place information management device, wherein the predetermined place includes at least one of a place about which the place information is not stored in the place information storage section, a place corresponding to the place information in which an information amount of the first emotion information is equal to or less than a predetermined value, a place corresponding to the place information in which a degree of reliability of the first emotion information is equal to or less than a predetermined value, and a place designated beforehand according to changeability of scenery in the place.

An aspect of the present invention is the place information management device, further including a degree-of-matching rating acquisition section that acquires a degree-of-matching rating that is a rating on a degree of suitability, for the shot image, of the piece of music to be reproduced in time to display of the shot image, wherein when the degree-of-matching rating is equal to or more than a predetermined value, the place information generation and update section generates the first emotion information, or updates the first emotion information, about the place corresponding to the shooting position, based on the second emotion information in the music information, and stores the first emotion information in the place information storage section.

An aspect of the present invention is the place information management device, further including a music determination process determination section that determines whether or not the piece of music to be reproduced in time to display of the shot image is a piece of music determined based on the shot image and an instruction from a user of the piece of music, wherein when the piece of music is a piece of music determined based on the instruction from the user, the place information generation and update section generates the first emotion information, or updates the first emotion information, about the place corresponding to the shooting position, based on the second emotion information in the music information, and stores the first emotion information in the place information storage section.

An aspect of the present invention is the place information management device, wherein the instruction from the user includes at least any one of designation of the piece of music by the user, and agreement of the user about the piece of music that is automatically selected.

An aspect of the present invention is the place information management device, further including an object determination section that determines an object in the shot image, wherein when a main object in the shot image is not a person, the place information generation and update section generates the first emotion information, or updates the first emotion information, about the place corresponding to the shooting position, based on the second emotion information in the music information, and stores the first emotion information in the place information storage section.

An aspect of the present invention is a content delivery system including: any one of the above-described place information management devices; and a content output device that outputs content, wherein the content output device includes a content information storage section that stores beforehand content emotion information about an emotion that can be felt by a person who comes across the content, a position acquisition section that acquires a position of equipment that is an output destination of the content, a place information acquisition section that acquires, from the place information management device, the first emotion information about a place corresponding to the position of the output-destination equipment, and a content selection section that selects the content corresponding to the content emotion information according to the first emotion information acquired by the place information acquisition section, and the content output device outputs the content selected by the content selection section.

An aspect of the present invention is a place information management method for a place information management device including a place information storage section that stores place information in association with a place, the place information being information about the place and including first emotion information about an emotion that can be felt by a person who is present in the place, the place information management method including: by the place information management device, acquiring a shooting position of a shot image shot by a shooting device; acquiring music information that is information on a piece of music to be reproduced in time to display of the shot image, the music information including second emotion information about an emotion that can be felt by a person who listens to the piece of music; and generating the first emotion information, or updating the first emotion information, about a place corresponding to the shooting position, based on the second emotion information in the music information, and storing the first emotion information in the place information storage section.

According to any aspect of the present invention, accuracy of information about a place can be increased.

DETAILED DESCRIPTION OF THE PREFERRED EMBODIMENT

Hereinafter, an embodiment of the present invention is described with reference to the drawings.

Figure 1:
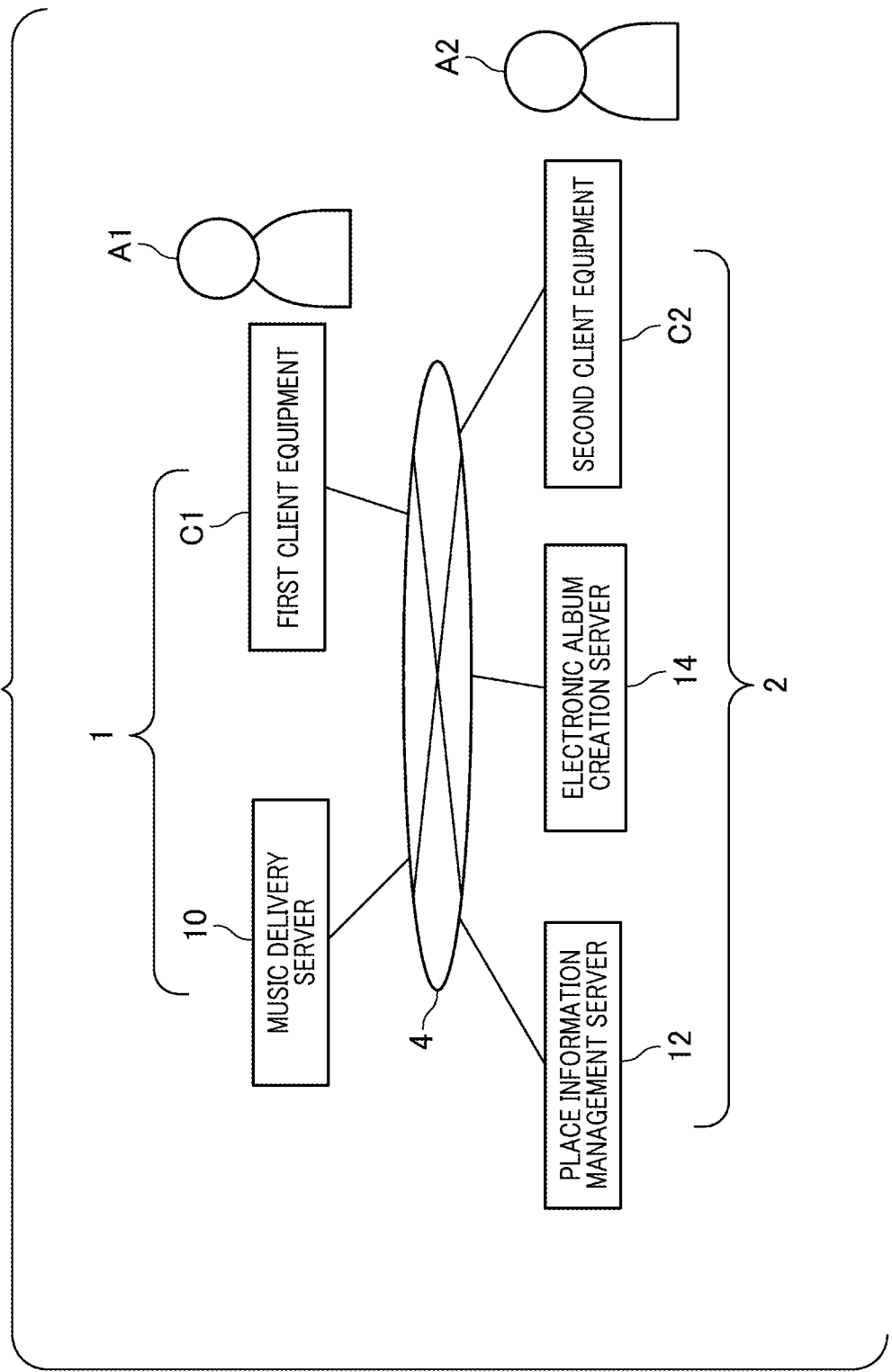
FIG. 1 shows a configuration of a music delivery system and a place information management system, according to an embodiment of the present invention.

FIG. 1 shows a configuration of a music delivery system 1 and a place information management system 2, according to the present embodiment.

The music delivery system 1 includes: a music delivery server 10 that provides a music delivery service through a telecommunication circuit 4 such as the Internet; and client equipment (hereinafter, referred to as "first client equipment C1") that uses the music delivery service.

Figure 2:
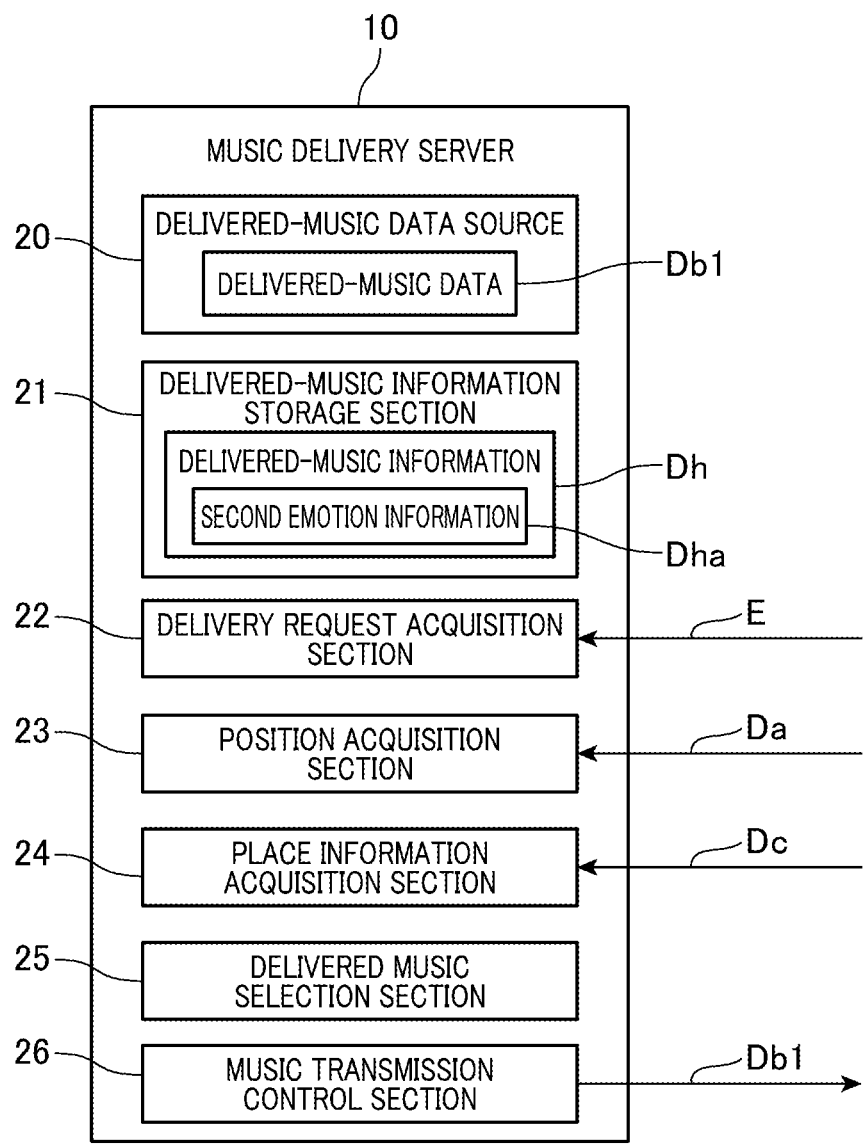
FIG. 2 shows a functional configuration of a music delivery server.

The music delivery server 10 in the present embodiment selects a piece of music, based on a current position Da of the first client equipment C1 (FIG. 2), and delivers music data Db1 on the piece of music (FIG. 2). Thus, when a user (hereinafter, referred to as "first user A1") of the first client equipment C1 is moving on foot or by riding in a vehicle, suitable music for a place being traveled is delivered. Note that in the present embodiment, "music" refers to sound patterns played by using a musical instrument, voice, a computer, or the like, and may include a song or no song.

The place information management system 2 includes: a place information management server 12 that manages place information Dc (FIG. 6), which is information about a place; an electronic album creation server 14 that provides an electronic album creation service through the telecommunication circuit 4; and client equipment (hereinafter, referred to as "second client equipment C2") that uses the electronic album creation service.

In the present embodiment, a "place" refers to one of areas into which a map is zoned, and a "position" refers to a specific point.

Moreover, the place information Dc in the present embodiment is also information serving as an index used when the music delivery server 10 selects a piece of music based on the current position Da, and includes first emotion information Dca about an emotion that can be felt by a person in the place.

Emotions include human feelings, impulse, desire, and the like. More specifically, emotions include feelings, impulse, desire, and the like that people feel about any feature coming into sight in a place, or about any association suggested by the place.

The feature is a natural or artificial thing existing on the earth, and is a landmark, a landscape (the sea or river, dusk, grassland, mountains, illuminations, or the like), or the like.

The association is an impression or the like that many people have about a feature, a personage, and an event related to a place, as well as about the place.

For example, when a place is a big city, any of feelings, such as "glamourous" and "bustling", and impulse and desire, such as "playing", is recorded in the first emotion information Dca. Moreover, for example, when a place is a seaside, any of feelings, such as "refreshing", "liberated", and "hot in the summer", and impulse and desire, such as "swimming in the sea" and "fishing", is recorded in the first emotion information Dca.

In the first emotion information Dca, a word indicating an emotion is recorded as tag information.

Note that the first emotion information Dca may be information on the feature or the association that is a factor causing the person to feel the emotion. In such a case, a word indicating the feature or the association is recorded as tag information in the first emotion information Dca.

The place information management server 12 in the present embodiment uses information acquired from an electronic album Dd (FIG. 4), which a user (hereinafter, referred to as "second user A2") of the electronic album creation service creates by operating the second client equipment C2, to generate new place information Dc, or to update the first emotion information, in the place information Dc.

The electronic album Dd in the present embodiment is data that allows the second user A2 to view a shot image De (FIG. 5) along with listening to music, and is data in which the shot image De to be displayed and music data Db2 (FIG. 4) to be reproduced in time to display of the shot image De are packaged.

The music data Db2 is data on a piece of music designated by the second user A2, or a piece of music automatically determined based on a publicly known or well-known technique of creating an electronic album, as music to be reproduced in time to display of the shot image De. For such a piece of music, in general, a piece of music having a strong connection with the shot image De is determined by designation made by the second user A2, or automatically.

The shot image De is data on an image or a video with additional information Df including various metadata, and the metadata includes various information such as a shooting position Df1 and shooting time information Df2. The shooting position Df1 is information indicating a position at a time of shooting. When the shot image De is a video, a position at a time of shooting is recorded in the shooting position Df1 at appropriate time intervals, over a duration for which the video is shot. The shooting time information Df2 is information including at least any one of a date and a time of day when shooting takes place. In the shooting time information Df2 in the present embodiment, information on both a date and a time of day (that is, a date and time) when shooting takes place is recorded.

Based on a correspondence between such a shot image De and music data Db2, the place information management server 12 in the present embodiment generates or updates place information Dc about a place including a shooting position Df1 of the shot image De, whereby enhancement and higher accuracy of the place information Dc are achieved. The place information Dc (first emotion information Dca) is configured to be able to be referred to by the music delivery server 10 through the telecommunication circuit 4, and is used to select a piece of music corresponding to a place where the first user A1 is present.

Next, each device is described in more detail.

Note that in the description below, a piece of music delivered by the music delivery server 10 is referred to as delivered piece of music or delivered music, and data on the delivered music is referred to as delivered-music data Db1. Moreover, a piece of music used in an electronic album Dd is referred to as piece of stock music or stock music, and data on the stock music is referred to as stock-music data Db2.

FIG. 2 shows a functional configuration of the music delivery server 10.

The music delivery server 10 includes a computer that includes: a processor such as a CPU (Central Processing Unit) or an MPU (Micro-Processing Unit); a memory device (also referred to as main storage device) such as a ROM (Read Only Memory) or a RAM (Random Access Memory); a storage device (also referred to as secondary storage device) such as an HDD (hard disk drive) or an SSD (Solid State Drive); a communication device (receiver and transmitter) that performs communication through the telecommunication circuit 4; and an interface circuit for connection with various peripheral equipment. The processor implements various functions related to the music delivery service, by executing a computer program stored in the memory device or the storage device. Note that the music delivery server 10 may include a plurality of computers, and the individual computers may implement the functions related to the music delivery service through cooperation.

As functional components, the music delivery server 10 includes a delivered-music data source 20, a delivered-music information storage section 21 (memory), a delivery request acquisition section 22, a position acquisition section 23, a place information acquisition section 24, a delivered music selection section 25, and a music transmission control section 26.

The delivered-music data source 20 stores delivered-music data Db1, which is data on delivered music, and the delivered-music information storage section 21 stores beforehand delivered-music information Dh, which is information related to the delivered music.

The delivered-music information Dh includes information indicating an attribute of the delivered music, and also includes second emotion information Dha about an emotion that can be felt by a person who listens to the delivered music.

The information indicating the attribute is appropriate information used for music classification or the like, and is information on, for example, music title, music composer, lyric writer, player, singer, genre (classical music, jazz, pop, folk, or the like), age of release, and the like.

The second emotion information Dha includes any of feelings, impulse, desire, and the like that a person feels about a melody, an atmosphere, and lyrics of the delivered music. For example, any of words such as "gloomy", "happy", "lilting", "refreshing", "grave", "hot in the summer", and "flavor of a snowy country" is recorded in the second emotion information Dha.

Such a word indicating an emotion is recorded as tag information in the second emotion information Dha.

Note that the second emotion information Dha, similarly to the first emotion information Dca, may be information on a factor causing the person to feel the emotion (for example, a word appearing in the lyrics, details of the lyrics, the melody, or the music atmosphere). In such a case, a word indicating the information is recorded as tag information in the second emotion information Dha.

The delivery request acquisition section 22 acquires a music delivery request E. The music delivery request E is a transmission message transmitted by the first client equipment C1, and is received by the communication device included in the music delivery server 10.

The position acquisition section 23 acquires the current position Da of the first client equipment C1. Note that transmission and reception of the current position Da between the music delivery server 10 and the first client equipment C1 is performed in an appropriate manner. The music delivery server 10 (position acquisition section 23) may request the first client equipment C1 to transmit the current position Da, or the first client equipment C1 may voluntarily transmit the current position Da to the music delivery server 10 when transmitting the music delivery request E.

The place information acquisition section 24 acquires the above-described place information Dc about a place (predetermined area) including the current position Da of the first client equipment C1, from the place information management server 12 through the telecommunication circuit 4.

The delivered music selection section 25 identifies second emotion information Dha corresponding to first emotion information Dca in the place information Dc, based on the place information Dc corresponding to the current position Da, and selects delivered music corresponding to the second emotion information Dha, as a piece to be delivered. Specifically, the delivered music selection section 25 searches the delivered-music information storage section 21 by using, for a search key, tag information included in the first emotion information Dca in the place information Dc, and identifies the second emotion information Dha including the largest number of the search keys. The delivered music selection section 25 then selects the delivered music corresponding to the delivered-music information Dh including the second emotion information Dha, as a piece to be delivered.

The music transmission control section 26 transmits delivered-music data Db1 to the first client equipment C1, based on the selection made by the delivered music selection section 25. Thus, the delivered music is delivered to the first client equipment C1, and the first user A1 can enjoy the delivered music that is suitable for the current place.

Figure 3:
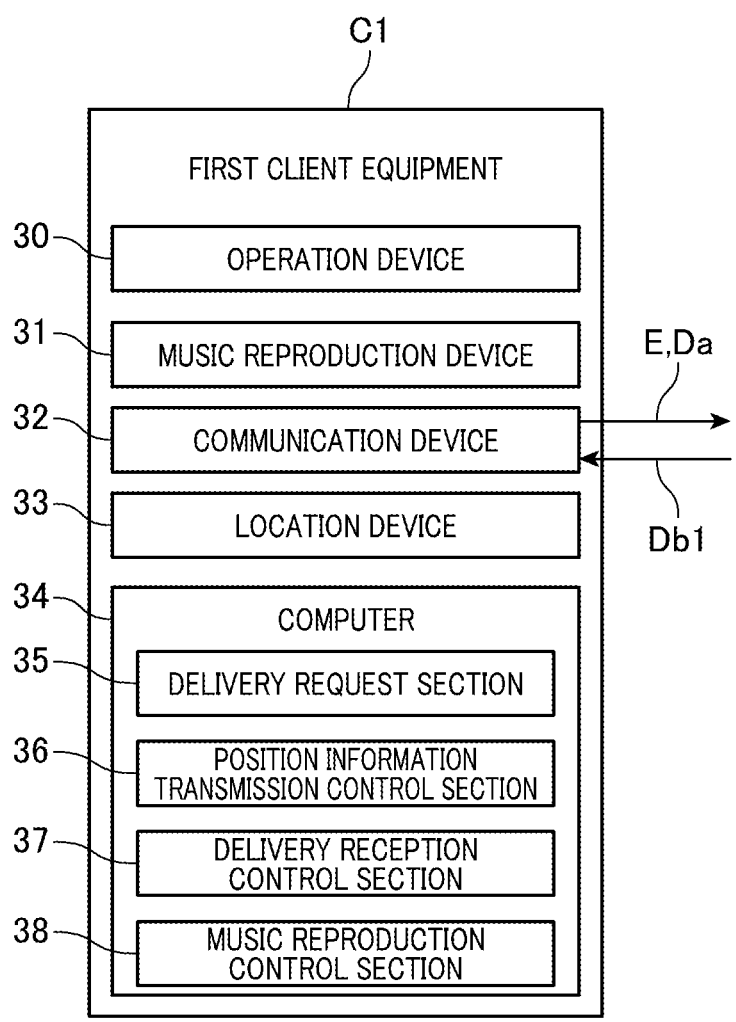
FIG. 3 shows a functional configuration of first client equipment.

FIG. 3 shows a functional configuration of the first client equipment C1.

The first client equipment C1 is equipment that is moved with the first user A1, and that takes delivery of delivered music from the music delivery server 10. The first client equipment C1 is, for example, mobile equipment such as a smartphone, wearable equipment such as a wearable computer, an in-vehicle device mounted in the vehicle in which the first user A1 rides, or the like.

As shown in FIG. 3, the first client equipment C1 in the present embodiment includes an operation device 30, a music reproduction device 31, a communication device 32 (transmitter/receiver, circuit), a location device 33, and a computer 34.

The operation device 30 is a device that receives an operation made by the first user A1, and is a button or a touch panel. The music reproduction device 31 is a device that reproduces delivered-music data Db1. The communication device 32 is a device that communicates with the music delivery server 10 through the telecommunication circuit 4. The location device 33 is a device that detects a current position Da. The location device 33 in the present embodiment includes a GNSS (Global Navigation Satellite System) receiver that receives positioning signals transmitted from a plurality of positioning satellites and, based on the positioning signals, identifies the current position Da.

The computer 34 includes a processor, a memory device, a storage device (also referred to as secondary storage device), and an interface circuit for connection with peripheral devices (the operation device 30, the music reproduction device 31, the communication device 32, the location device 33, and the like), and functions as a client computer to the music delivery server 10 by the processor executing a computer program stored in the memory device or the storage device.

Specifically, as functional components, the computer 34 includes a delivery request section 35, a position information transmission control section 36, a delivery reception control section 37, and a music reproduction control section 38.

The delivery request section 35 performs control for transmission of a music delivery request E from the communication device 32 to the music delivery server 10 when the first user A1 makes an operation (instruction), or when it is determined that the first user A1 is in a predetermined place. The determination of whether or not the first user A1 is in the predetermined place can be performed by using a publicly known or well-known technique using the location device 33 and map information. Note that the delivery request section 35 may perform the determination, or the computer 34 may include a functional section for performing such determination, separately from the delivery request section 35. The current position Da may be transmitted together with the music delivery request E.

The position information transmission control section 36 performs control for transmission of the current position Da from the communication device 32 to the music delivery server 10.

The delivery reception control section 37 performs control for reception, by the communication device 32, of delivered-music data Db1 from the music delivery server 10, and the music reproduction control section 38 performs control for reproduction of the delivered-music data Db1 by controlling the music reproduction device 31.

Figure 4:
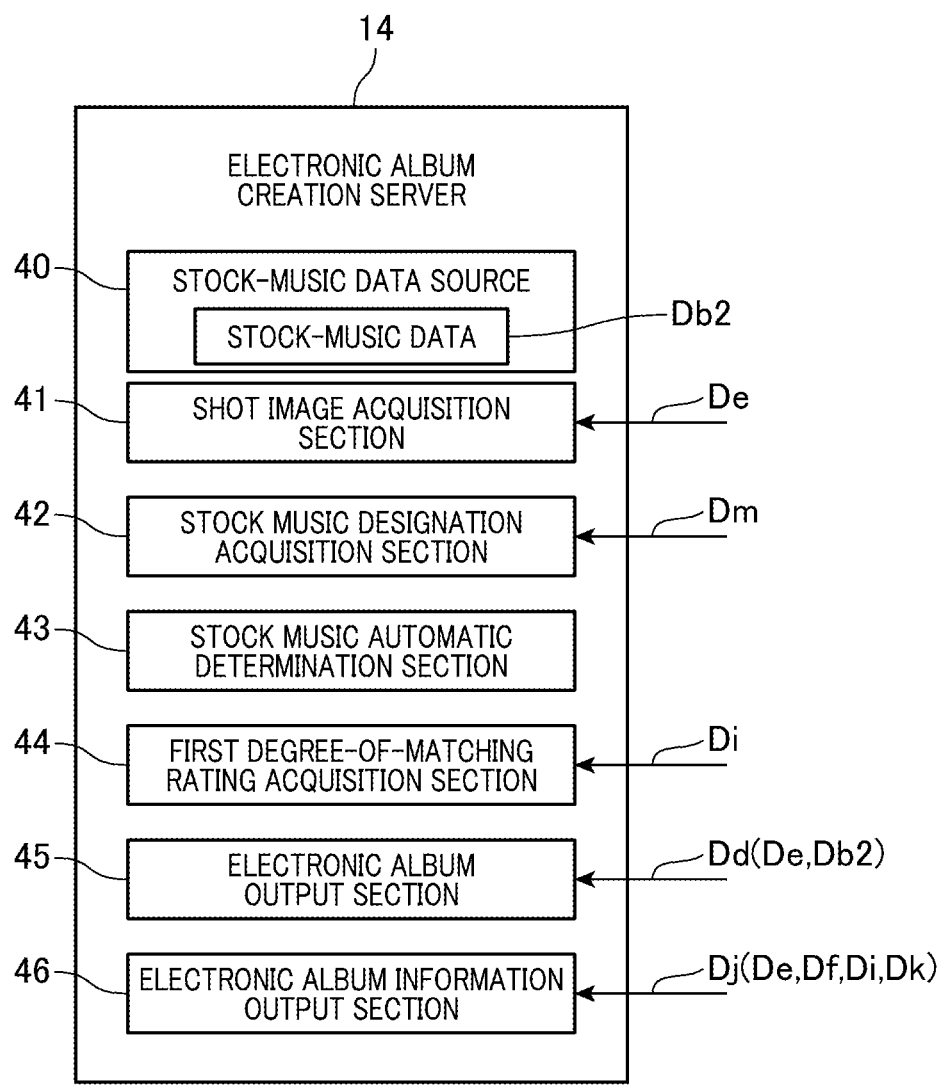
FIG. 4 shows a functional configuration of an electronic album creation server.

FIG. 4 shows a functional configuration of the electronic album creation server 14.

The electronic album creation server 14 includes a computer that includes: a processor; a memory device (also referred to as main storage device); a storage device (also referred to as secondary storage device); a communication device (receiver and transmitter) that performs communication through the telecommunication circuit 4; and an interface circuit for connection with various peripheral equipment. The processor implements various functions related to the electronic album creation service by executing a computer program stored in the memory device or the storage device. Note that the electronic album creation server 14 may include a plurality of computers, and the individual computers may implement the functions related to the music delivery service through cooperation.

As functional components, the electronic album creation server 14 includes a stock-music data source 40, a shot image acquisition section 41, a stock music designation acquisition section 42, a stock music automatic determination section 43, a first degree-of-matching rating acquisition section 44, an electronic album output section 45, and an electronic album information output section 46.

The stock-music data source 40 stores beforehand stock-music data Db2, which is data on stock music in an electronic album Dd.

The shot image acquisition section 41 acquires a shot image De, which is data on an image serving as a stock available for the electronic album Dd. The stock music designation acquisition section 42 acquires user-designated stock-music information Dm, which is designation, made by the second user A2, of stock music to be reproduced in time to display of a shot image De, from the second client equipment C2.

The acquisition of the shot image De and the user-designated stock-music information Dm is performed by the communication device receiving the shot image De and the user-designated stock-music information Dm from the second client equipment C2.

When the second user A2 does not designate stock music by using the user-designated stock-music information Dm, the stock music automatic determination section 43 automatically determines stock music, in behalf of the second user A2. For a method of determining the stock music, a publicly known or well-known appropriate method is used, such as a determination method based on a shot image De, or a determination method based on an attribute, a preference, or the like of the second user A2.

When the stock music automatic determination section 43 determines stock music in behalf of the second user A2, the first degree-of-matching rating acquisition section 44 acquires a degree-of-matching rating Di for the stock music.

The degree-of-matching rating Di is a rating value obtained by the second user A2 rating a degree of matching between the stock music and the shot image De. The degree of matching is a degree indicating how suitable the stock music is as a piece of music reproduced in time to display of the shot image De, and is rated based on an emotion (that is, subjective view) of the second user A2. Note that a form of the degree-of-matching rating Di is arbitrary as long as the form allows the rating to be converted into a score. Moreover, the acquisition of the degree-of-matching rating Di is performed by the communication device receiving the degree-of-matching rating Di from the second client equipment C2.

The electronic album output section 45 creates an electronic album Dd in which stock-music data Db2 on the stock music is associated with the shot image De, and transmits the electronic album Dd to the second client equipment C2.

The electronic album information output section 46 outputs electronic album information Dj on the electronic album Dd to the place information management server 12. The electronic album information Dj is information including at least a correspondence between a shooting position Df1 of the shot image De and the music data Db2. In the present embodiment, the electronic album information Dj includes additional information Df on the shot image De, the degree-of-matching rating Di, and stock music identification information Dk, which is identification information on the stock music. Note that the electronic album Dd itself may be used for the electronic album information Dj.

Figure 5:
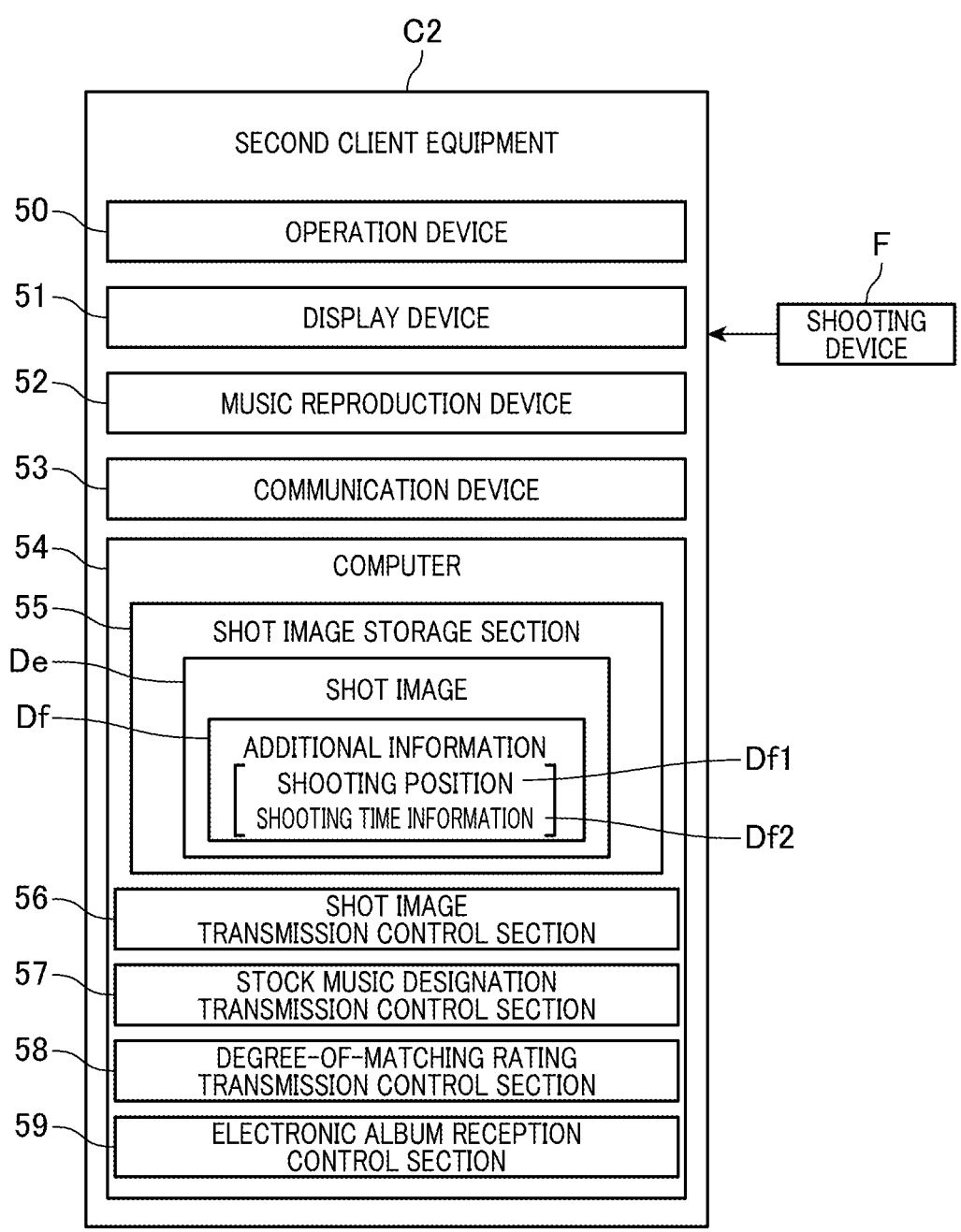
FIG. 5 shows a functional configuration of second client equipment.

FIG. 5 shows a functional configuration of the second client equipment C2.

The second client equipment C2 is equipment operated by the second user A2 to create an electronic album, and is, for example, a smartphone, a notebook personal computer, a desktop personal computer, or the like. As shown in FIG. 5, the second client equipment C2 includes an operation device 50, a display device 51 (display), a music reproduction device 52, a communication device 53 (transmitter/receiver, circuit), and a computer 54.

The operation device 50 is a device that receives an operation made by the second user A2, and is a button or a touch panel. The display device 51 is a device that displays various information. Examples of the various information include a shot image De in an electronic album Dd, and a shot image De that is a candidate for a stock before an electronic album Dd is created. The music reproduction device 52 is a device that reproduces stock-music data Db2 for an electronic album Dd, and stock-music data Db2 that is a candidate for a stock before an electronic album Dd is created. The communication device 53 is a device that communicates with the electronic album creation server 14 through the telecommunication circuit 4.

The computer 54 includes a processor, a memory device, a storage device (also referred to as secondary storage device), and an interface circuit for connection with peripheral devices (the operation device 50, the display device 51, the music reproduction device 52, the communication device 53, and the like), and functions as a client computer to the electronic album creation server 14 by the processor executing a computer program stored in the memory device or the storage device.

Specifically, as functional components, the computer 54 includes a shot image storage section 55 (memory), a shot image transmission control section 56, a stock music designation transmission control section 57, a degree-of-matching rating transmission control section 58, and an electronic album reception control section 59.

The shot image storage section 55 stores a shot image De that is a candidate for a stock in an electronic album Dd. The shot image De is data shot by the second user A2 using a shooting device F (camera), and captured by the second client equipment C2 from the shooting device F via the interface circuit. Note that the second client equipment C2 may include the shooting device F.

The shot image transmission control section 56 performs control for transmission of one or more shot images De selected based on an operation made by the second user A2, from the communication device 53 to the electronic album creation server 14.

The stock music designation transmission control section 57 performs control for transmission of user-designated stock-music information Dm designated based on an operation made by the second user A2, from the communication device 53 to the electronic album creation server 14. Note that the stock music designation transmission control section 57 may acquire a list of pieces of stock music from the electronic album creation server 14, may display the list on the display device 51, and may allow the second user A2 to select a piece of stock music from the list.

The degree-of-matching rating transmission control section 58 performs control for transmission of the above-described degree-of-matching rating Di that is inputted through an operation made by the second user A2, from the communication device 53 to the electronic album creation server 14. The electronic album reception control section 59 performs control for reception, by the communication device 53, of an electronic album Dd outputted from the electronic album creation server 14.

In the second client equipment C2, the display device 51 displays the shot image De in the electronic album Dd, and the music reproduction device 52 reproduces the stock-music data Db2 in time to the display, whereby the electronic album Dd is viewed and listened to by the second user A2.

Figure 6:
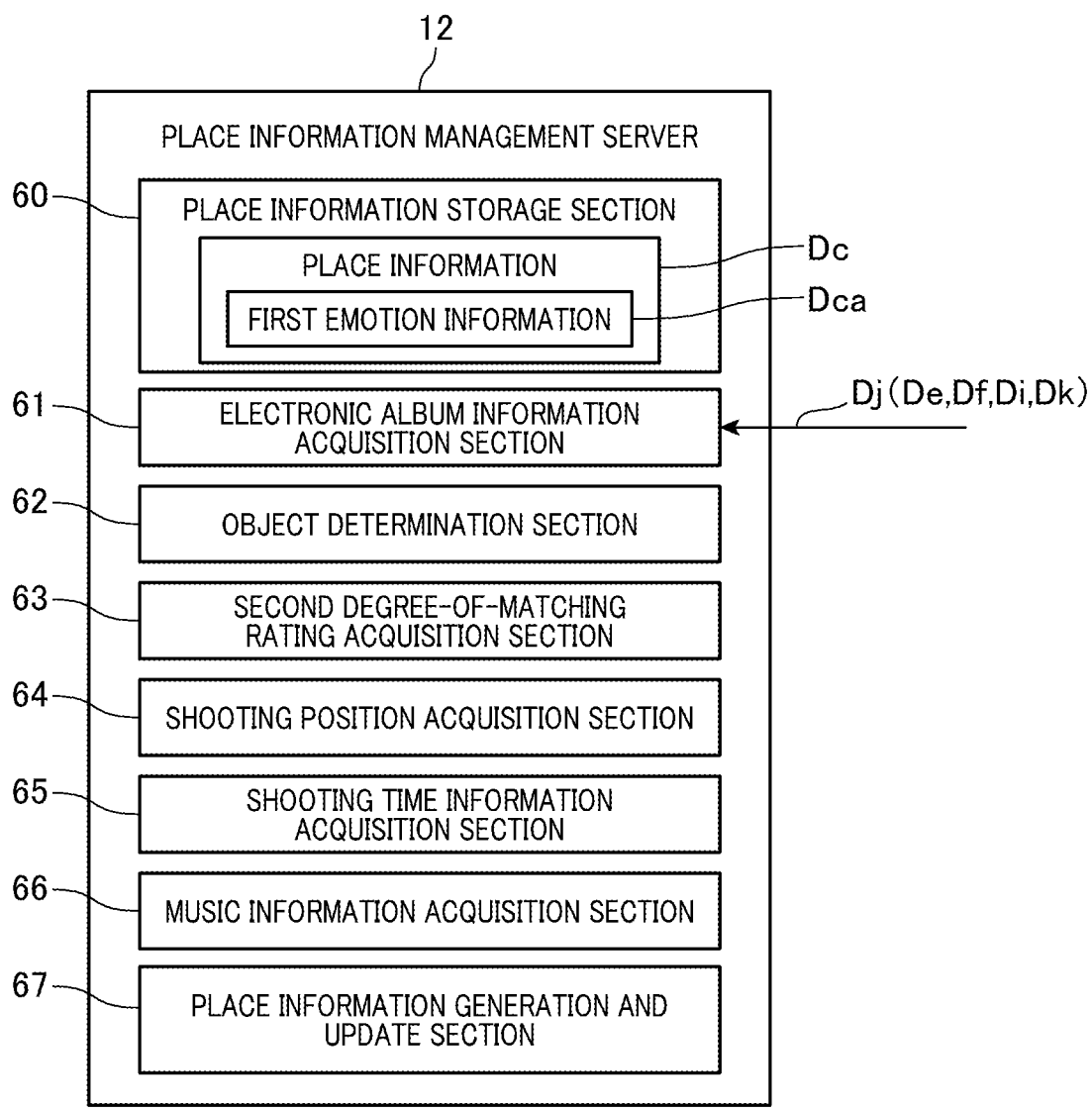
FIG. 6 shows a functional configuration of a place information management server.

FIG. 6 shows a functional configuration of the place information management server 12.

The place information management server 12 includes a computer that includes: a processor; a memory device (also referred to as main storage device); a storage device (also referred to as secondary storage device); a communication device (receiver and transmitter) that performs communication through the telecommunication circuit 4; and an interface circuit for connection with various peripheral equipment. The processor implements various functions related to management of place information Dc by executing a computer program stored in the memory device or the storage device. Note that the place information management server 12 may include a plurality of computers, and the individual computers may implement the functions related to management of place information Dc through cooperation.

As functional components, the place information management server 12 includes a place information storage section 60 (memory), an electronic album information acquisition section 61, an object determination section 62, a second degree-of-matching rating acquisition section 63, a shooting position acquisition section 64, a shooting time information acquisition section 65, a music information acquisition section 66, and a place information generation and update section 67.

The place information storage section 60 stores the above-described place information Dc in association with a place indicated by the place information Dc. The electronic album information acquisition section 61 acquires electronic album information Dj from the electronic album creation server 14 through the telecommunication circuit 4.

The object determination section 62 determines, with respect to a shot image De used for a stock in the electronic album Dd, whether or not a person is a main object in the image. Specifically, the object determination section 62 recognizes, by using a publicly known or well-known recognition technique, whether or not a person appears as an object in the shot image De. The object determination section 62 then determines whether or not the person is a main object, based on a proportion of an image area covered by the object that is the person, the number of the persons, or the like in the shot image De.

A shot image De in which a person is a main object has relatively little information about a place of a shooting position Df1 of the shot image De. Moreover, for stock music for such a shot image De, a piece of music connected with a recollection or the like shared with the person who is an object tends to be used more than a piece of music connected with the place of the shooting position Df1. In other words, there is a low degree of certainty that a piece of stock music, in an electronic album Dd, associated with the shot image De in which a person is a main object is a suitable piece of music for the place of the shooting position Df1 of the shot image De. Accordingly, such a shot image De is configured not to be used in generation or update of the place information Dc in the present embodiment.

The second degree-of-matching rating acquisition section 63 acquires a degree-of-matching rating Di from the electronic album information Dj, the shooting position acquisition section 64 acquires a shooting position Df1 from additional information Df on the shot image De, and the shooting time information acquisition section 65 acquires shooting time information Df2 from the additional information Df.

The music information acquisition section 66 acquires music information Dn on stock music associated with the shot image De in the electronic album Dd. Similarly to the above-described delivered-music information Dh kept by the music delivery server 10, the music information Dn includes information indicating an attribute of the music, and second emotion information Dha about an emotion felt by a person who listens to the music. In the present embodiment, the delivered-music information Dh is used for the music information Dn, and the music information acquisition section 66 acquires the music information Dn on the stock music from the music delivery server 10 through the telecommunication circuit 4. Note that the place information management server 12, obviously, may include a database of music information Dn.

Based on the music information Dn, the place information generation and update section 67 generates new first emotion information Dca, or updates first emotion information Dca, in place information Dc about a place indicated by the shooting position Df1 of the shot image De. The place information generation and update section 67 stores the music information Dn in the place information storage section 60.

Figure 7:
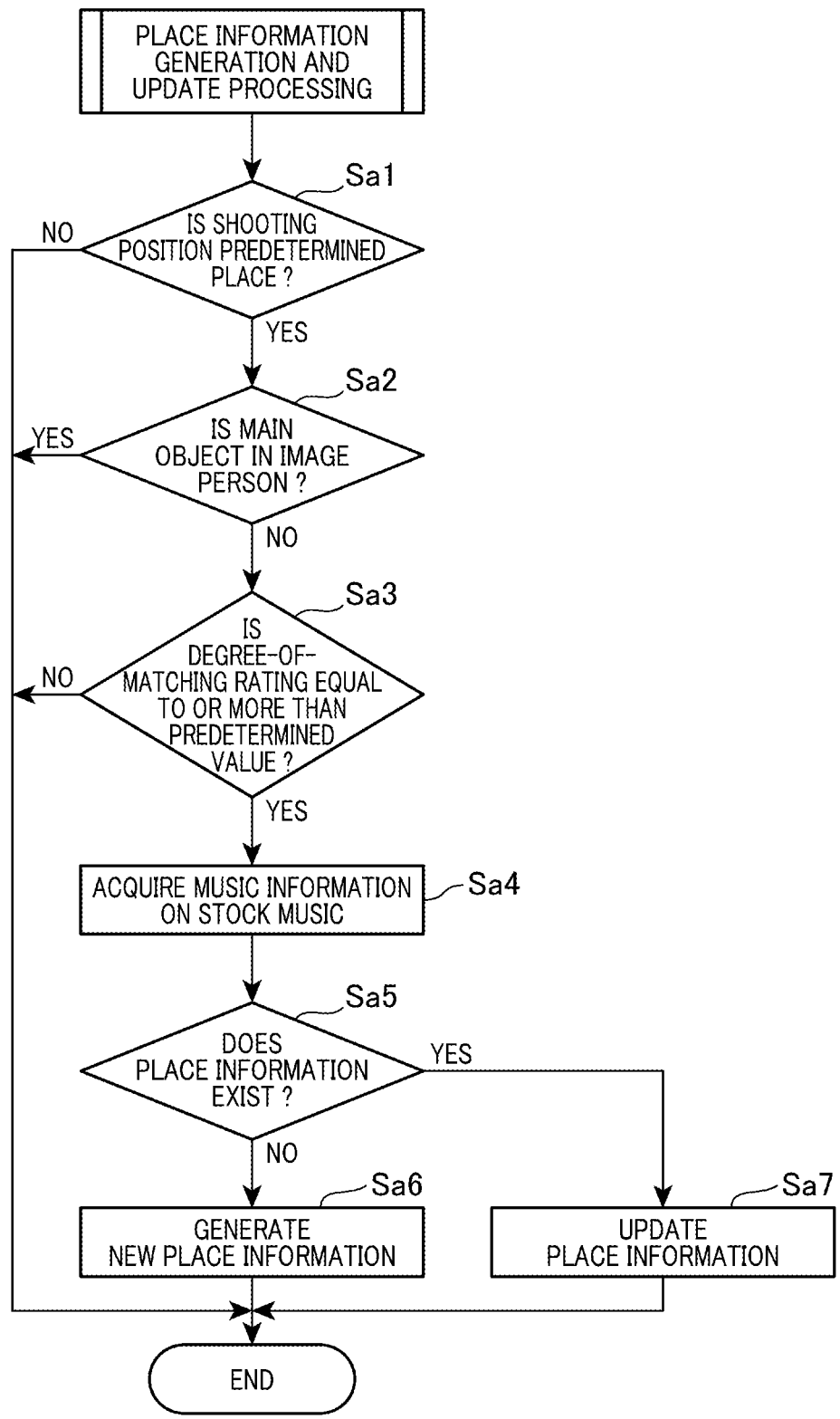
FIG. 7 is a flowchart of place information generation and update processing.

FIG. 7 is a flowchart of processing of generating and updating place information Dc.

In the place information management server 12, the place information generation and update section 67 generates new first emotion information Dca or updates first emotion information Dca in place information Dc, in accordance with a procedure shown in FIG. 7.

First, the place information generation and update section 67 determines whether or not a place corresponding to a shooting position Df1 of a shot image De is a predetermined place (step Sa1). The predetermined place is a preset place for which generation of new first emotion information Dca, or an update of first emotion information Dca, in place information Dc is required, and at least any one, or more, of the following four places is set as the predetermined place in the present embodiment. A first place is a place about which no place information Dc (first emotion information Dca) is stored in the place information storage section 60. A second place is a place corresponding to the place information Dc in which the information amount of the first emotion information Dca is equal to or less than a predetermined value (that is, the information amount is scarce). A third place is a place corresponding to the place information Dc in which the degree of reliability of the first emotion information Dca is equal to or less than a predetermined degree (that is, the degree of reliability is low). For example, when the first emotion information Dca includes a predetermined number of information pieces or more on conceptually contradictory emotions or the like, the degree of reliability of the first emotion information Dca is regarded as equal to or less than the predetermined degree. A fourth place is a place designated beforehand as having changeable scenery, and is a place for which it is desirable to update the place information Dc with high frequency. An example of the fourth place is a place where scenery often changes because the place is developing or the like.

When the place of the shooting position Df1 does not apply to the predetermined place (step Sa1: No), the place information generation and update section 67 immediately terminates the processing, and, when the place of the shooting position Df1 applies to the predetermined place (step Sa1: Yes), determines whether or not stock music in an electronic album Dd is suitable music for the place of the shooting position Df1. Specifically, the place information generation and update section 67 determines whether or not a main object in the shot image De is a person (step Sa2), and determines whether or not a degree-of-matching rating Di is equal to or more than a predetermined value (step Sa3).

When the main object is a person (step Sa2: Yes), there is a low degree of certainty that the stock music associated with the shot image De is suitable music for the place of the shooting position Df1, as described above. Accordingly, in such a case, the place information generation and update section 67 immediately terminates the processing.

Next, when the degree-of-matching rating Di is lower (step Sa3: No), it is suggested by the second user A2 that the stock music has a low degree of suitability for the shot image De, and a connection between the stock music and the place corresponding to the shooting position Df1 can be regarded as remote. Accordingly, in such a case, the place information generation and update section 67 immediately terminates the processing.

When the degree-of-matching rating Di is equal to or more than the predetermined value (step Sa3: Yes), it is indicated that the stock music is rated by the second user A2 as having a high degree of suitability for the shot image De. In the generation and update processing in the present embodiment in particular, the determination in step Sa3 is performed when a shot image De in which a main object is a person is excluded due to the determination in step Sa2, and there is therefore a high degree of certainty that the stock music is connected with the place corresponding to the shooting position Df1, that is, it is highly probable that the stock music is suitable music for the place of the shooting position Df1.

Accordingly, when the degree-of-matching rating Di is equal to or more than the predetermined value (step Sa3: Yes), the place information generation and update section 67 generates new first emotion information Dca or updates the first emotion information Dca in the place information Dc, based on the stock music.

Specifically, first, the place information generation and update section 67 acquires music information Dn on the stock music (step Sa4). Thus, second emotion information Dha associated with the stock music is acquired. Then, when the place information Dc about the place of the shooting position Df1 does not exist in the place information storage section 60 (step Say: No), the place information generation and update section 67 generates new first emotion information Dca for the place information Dc, based on the second emotion information Dha in the music information Dn (step Sa6). When the place information Dc already exists in the place information storage section 60 (step Say: Yes), the place information generation and update section 67 updates the first emotion information Dca in the place information Dc, based on the second emotion information Dha in the music information Dn (step Sa7).

Here, in the generation of the new place information Dc (step Sa6) and the update of the place information Dc (step Sa7), when the place corresponding to the shooting position Df1 is a specific place, the place information generation and update section 67 classifies the second emotion information Dha about the stock music, for each recorded time (date or/and time of day) in shooting time information Df2 on the shot image De, and generates the new first emotion information Dca or updates the first emotion information Dca in the place information Dc, based on the second emotion information Dha after classified. Then, the place information generation and update section 67 stores the first emotion information Dca in the place information storage section 60, in association with a time based on the shooting time information Df2.

In the present embodiment, the "specific place" is a place where particularly striking scenery (for example, dusk, starry sky, or the like) can be seen in or at a specific time (certain hours, time of day, time of year, or the like). Thus, for a place where scenery or an ambience changes in or at a specific time, the first emotion information Dca matched with the specific time can be acquired.

According to the present embodiment, the following advantageous effects are brought about.

The place information management server 12 in the present embodiment includes: the place information storage section 60 that stores place information Dc in association with a place, the place information Dc being information about the place and including first emotion information Dca about an emotion that can be felt by a person who is present in the place; the shooting position acquisition section 64 that acquires a shooting position Df1 of a shot image De shot by the shooting device F; the music information acquisition section 66 that acquires music information Dn that is information on a piece of stock music to be reproduced in time to display of the shot image De, the music information Dn including second emotion information Dha about an emotion that can be felt by a person who listens to the piece of stock music; and the place information generation and update section 67 that generates new first emotion information Dca, or update the first emotion information Dca, about a place corresponding to the shooting position Df1, based on the second emotion information Dha in the music information Dn, and stores the first emotion information Dca in the place information storage section 60.

According to such a configuration, the new first emotion information Dca is generated, or the first emotion information Dca is updated, about the place corresponding to the shooting position Df1, by using the second emotion information Dha about the stock music in the electronic album Dd created by the second user A2.

Thus, a lot of first emotion information Dca can be collected about various places, and accuracy of the first emotion information Dca can be increased.

The place information management server 12 in the present embodiment includes the shooting time information acquisition section 65 that acquires shooting time information Df2 including information on at least any one (in the present embodiment, both) of a date and a time of day when the shot image De is shot. The place information generation and update section 67 classifies the second emotion information Dha, based on the shooting time information Df2, generates the new first emotion information Dca, or updates the first emotion information Dca, about the place corresponding to the shooting position Df1, based on the second emotion information Dha after classified, and stores the first emotion information Dca in the place information storage section 60, in association with a time based on the shooting time information Df2.

According to such a configuration, the first emotion information Dca matched with a specific time can be acquired about a place where scenery or an ambience changes in or at the specific time.

In the place information management server 12 in the present embodiment, when the place corresponding to the shooting position Df1 is a predetermined place, the place information generation and update section 67 generates the new first emotion information Dca, or updates the first emotion information Dca, about the place corresponding to the shooting position Df1, based on the second emotion information Dha in the music information Dn, and stores the first emotion information Dca in the place information storage section 60.

According to such a configuration, a target place about which the new first emotion information Dca is generated or the first emotion information Dca is updated can be controlled by setting a predetermined place.

In the place information management server 12 in the present embodiment, the predetermined place includes at least one of: a place about which the place information Dc (first emotion information Dca) is not stored in the place information storage section 60; a place corresponding to the place information Dc in which the information amount of the first emotion information Dca is equal to or less than a predetermined value; a place corresponding to the place information Dc in which the degree of reliability of the first emotion information Dca is equal to or less than a predetermined value; and a place designated beforehand as having changeable scenery.

According to such a configuration, the first emotion information Dca can be reliably enhanced about a place for which generation of the new first emotion information Dca, or an update of the first emotion information Dca, in the place information Dc is relatively much required, and accuracy of the first emotion information Dca can be increased.

The place information management server 12 in the present embodiment includes the second degree-of-matching rating acquisition section 63 that acquires a degree-of-matching rating Di that is a rating on a degree of suitability, for the shot image De, of the piece of stock music to be reproduced in time to display of the shot image De. When the degree-of-matching rating Di is equal to or more than a predetermined value, the place information generation and update section 67 generates the new first emotion information Dca, or updates the first emotion information Dca, about the place corresponding to the shooting position Df1, based on the second emotion information Dha in the music information Dn, and stores the first emotion information Dca in the place information storage section 60.

According to such a configuration, the new first emotion information Dca can be generated, or the first emotion information Dca can be updated, by using the second emotion information Dha about the stock music having a high degree of suitability for the shot image De.

The place information management server 12 in the present embodiment includes the object determination section 62 that determines an object in the shot image De. When a main object in the shot image De is not a person, the place information generation and update section 67 generates the first emotion information Dca, or updates the first emotion information Dca, about the place corresponding to the shooting position Df1, based on the second emotion information Dha in the music information Dn, and stores the first emotion information Dca in the place information storage section 60.

According to such a configuration, the first emotion information Dca can be prevented from being generated or updated based on the stock music when there is a low degree of certainty that the stock music is suitable music for the place of the shooting position Df1.

The music delivery system 1 in the present embodiment includes the place information management server 12, and the music delivery server 10 that delivers delivered music to the first client equipment C1. The music delivery server 10 includes: a delivered-music information storage section 21 that stores beforehand content emotion information (in the present embodiment, second emotion information Dha) about an emotion that can be felt by a person who listens to the delivered music; a position acquisition section 23 that acquires a current position Da of the first client equipment C1; a place information acquisition section 24 that acquires, from the place information management server 12, first emotion information Dca about a place corresponding to the current position Da of the first client equipment C1; and a delivered music selection section 25 that selects delivered music corresponding to the content emotion information (second emotion information Dha) according to the first emotion information Dca, and the music delivery server 10 delivers the delivered music that is selected by the delivered music selection section 25.

According to such a configuration, delivered music that is more suitable for the current place of the first client equipment C1 (that is, user A1) can be delivered.

Note that the above-described embodiment is only an illustration of one aspect of the present invention. In other words, modifications and applications of the above-described embodiment can be arbitrarily made, without departing from the gist of the present invention, and each aspect according to the embodiment, the modifications, and the applications can be arbitrarily combined with another.

(Modification 1)

In the above-described embodiment, when stock music in an electronic album Dd is a piece of music determined based on an instruction from the second user A2 who is the creator as well as the listener and viewer of the electronic album Dd, the place information generation and update section 67 of the place information management server 12 may be configured to generate first emotion information Dca or to update the first emotion information Dca about the place corresponding to the shooting position Df1, based on the second emotion information Dha in the music information Dn on the stock music.

Figure 8:
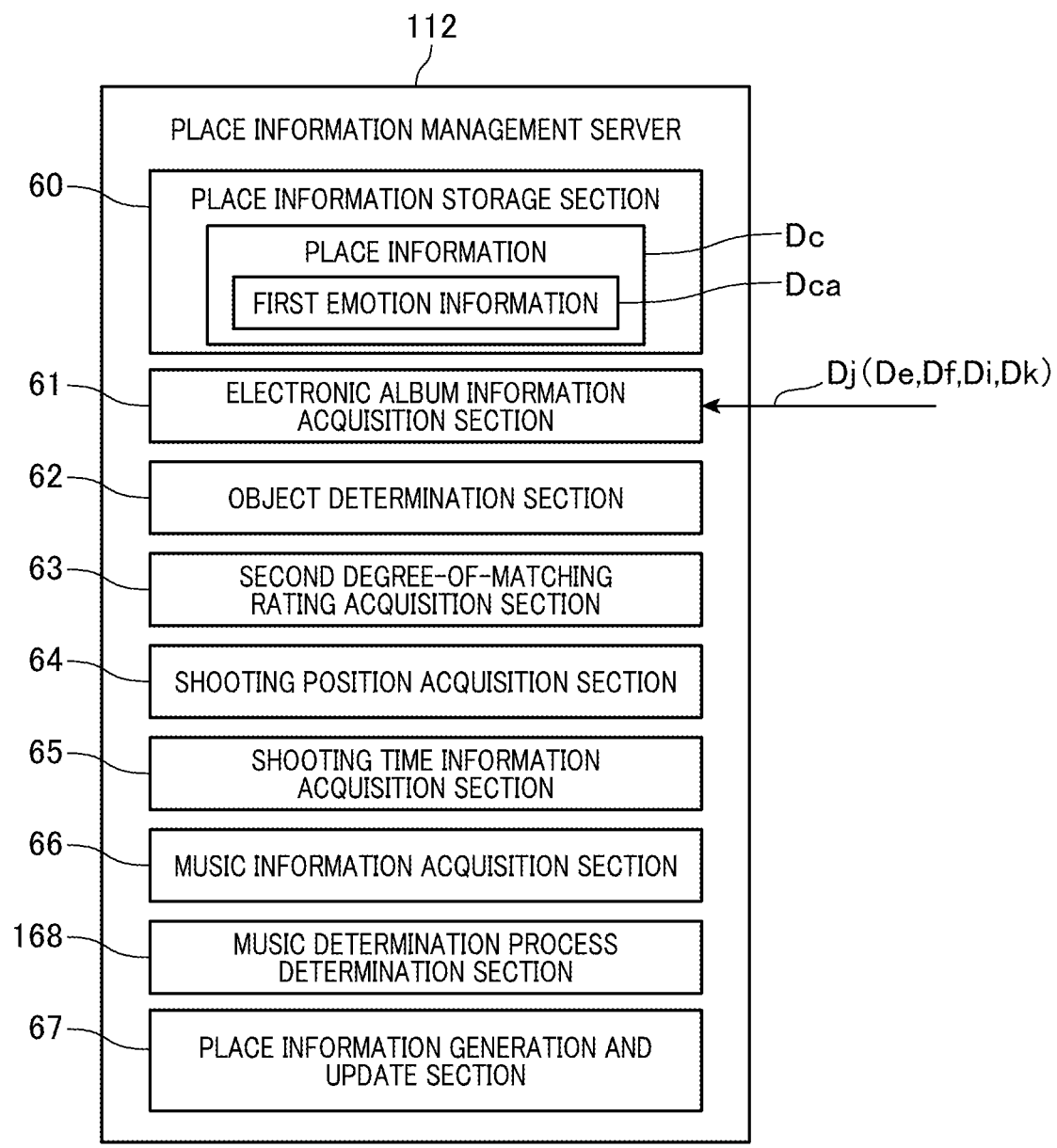
FIG. 8 shows a functional configuration of a place information management server according to a modification 1 of the present invention.

FIG. 8 shows a functional configuration of a place information management server 112 according to the present modification. Note that in the drawing, already described components are denoted by the same reference signs, and a description thereof is omitted.

As shown in the drawing, the place information management server 112 according to the present modification is different from the place information management server 12 according to the above-described embodiment in a point of including a music determination process determination section 168.

The music determination process determination section 168 determines whether or not stock music (music that is reproduced in time to display of a shot image De) in an electronic album Dd is a piece of music determined based on an instruction from the second user A2.

Specifically, in the electronic album creation server 14, when the stock music designation acquisition section 42 acquires, from the second client equipment C2, the above-described user-designated stock-music information Dm, which is designation of a piece of stock music by the second user A2, the electronic album information output section 46 outputs the electronic album information Dj with addition of first information indicating that the stock music is determined based on designation by the second user A2. Based on the first information, the music determination process determination section 168 determines whether or not the stock music is a piece of music determined based on an instruction from the second user A2.

In the present modification, the instruction from the second user A2 about the stock music includes two forms as follows. A first form is that the second user A2 designates a piece of stock music. A second form is that the second user A2 agrees on associating a piece of stock music automatically determined by the stock music automatic determination section 43 with a shot image De, whereby the second user A2 designates the piece of stock music.

When stock music is determined based on an instruction in any one of the two forms, an emotion of the second user A2, who is a human, can be regarded as largely reflected in association between the stock music and the shot image De.

Then, in the processing of generating or updating place information Dc (first emotion information Dca), the place information generation and update section 67 of the place information management server 112 generates new first emotion information Dca or updates the first emotion information Dca about the place corresponding to the shooting position Df1 when the stock music is a piece of music determined based on an instruction from the second user A2, and does not generate new first emotion information Dca or update the first emotion information Dca when the stock music is not determined based on an instruction from the second user A2.

Thus, new first emotion information Dca can be generated or the first emotion information Dca can be updated about the place corresponding to the shooting position Df1, based on the second emotion information Dha about the stock music in which an emotion of the second user A2, who is a human, is reflected, so that accuracy of the first emotion information Dca can be further increased.

Note that in the generation and update processing shown in FIG. 7, a determination step related to the determination of whether or not stock music is a piece of music determined based on an instruction from the second user A2 may be performed at any timing of before step Sa1, between steps Sa1 and Sa3, and after step Sa3. The determination step may be performed in place of one or more steps of steps Sa1 to Sa3.

(Modification 2)

In the above-described embodiment, the place information management server 12 may omit step Sa2 (determination of whether or not the main object in the shot image De is a person) and step Sa3 (determination of whether or not the degree-of-matching rating Di is equal to or more than the predetermined value) shown in FIG. 7, as appropriate.

Moreover, the place information management server 12 may perform the processing shown in FIG. 7 only when the place corresponding to the shooting position Df1 applies to a predetermined type of place. The predetermined type of place may be an appropriate one, and may be, for example, a place with a lower degree of reliability or the like among the first to fourth places illustrated in step Sa1.

(Modification 3)

In the above-described embodiment, a description has been given of the music delivery server 10 that delivers delivered music as content, and the music delivery system 1 including the music delivery server 10.

However, the present invention is applicable to an appropriate content delivery server that uses place information Dc in delivery of various types of content, such as a video and text information, and a content delivery system including the content delivery server. In such a case, the content delivery server stores content information beforehand about an emotion that can be felt by a person who comes across the content, as information equivalent to the second emotion information Dha stored in the music delivery server 10.

(Other Modifications)

In the above-described embodiment, any two or more servers of the place information management server 12, the music delivery server 10 (content delivery server), and the electronic album creation server 14 may be consolidated.

In the above-described embodiment, the place information management server 12 does not need to include the server function of providing place information Dc, and may be a place information management device configured by using a non-server computer.

In the above-described embodiment and the modification 2, the music delivery server 10 and the content delivery server do not need to include the server function of providing content such as delivered music through the telecommunication circuit 4, and may be a device that is configured by using a non-server computer, and that outputs content such as delivered music.

Each drawing showing a functional configuration in the above-described embodiment and the modifications is a schematic diagram showing the constituent elements that are classified based on main processing contents in order to facilitate the understanding of the invention of the present application, and the constituent elements can be further classified into more constituent elements, depending on processing contents. Moreover, classification may be made such that one constituent element performs more processing.

(Configurations Supported by the Disclosure of the Present Specification)

The disclosure of the present specification supports the following configurations.

(Configuration 1)

A place information management device including: a place information storage section that stores place information in association with a place, the place information being information about the place and including first emotion information about an emotion that can be felt by a person who is present in the place; a shooting position acquisition section that acquires a shooting position of a shot image shot by a shooting device; a music information acquisition section that acquires music information that is information on a piece of music to be reproduced in time to display of the shot image, the music information including second emotion information about an emotion that can be felt by a person who listens to the piece of music; and a place information generation and update section that generates the first emotion information, or updates the first emotion information, about a place corresponding to the shooting position, based on the second emotion information in the music information, and stores the first emotion information in the place information storage section.

According to configuration 1, accuracy of the first emotion information about a place can be increased.

(Configuration 2)

The place information management device according to configuration 1, further including a shooting time information acquisition section that acquires shooting time information including information on at least any one of a date and a time of day when the shot image is shot, wherein the place information generation and update section classifies the second emotion information, based on the shooting time information, generates the first emotion information, or updates the first emotion information, about the place corresponding to the shooting position, based on the second emotion information after classified, and stores the first emotion information in the place information storage section in association with a time based on the shooting time information.

According to configuration 2, the first emotion information matched with a specific time can be acquired.

(Configuration 3)

The place information management device according to configuration 1 or 2, wherein when the place corresponding to the shooting position is a predetermined place, the place information generation and update section generates the first emotion information, or updates the first emotion information, about the place corresponding to the shooting position, based on the second emotion information in the music information, and stores the first emotion information in the place information storage section.

According to configuration 3, a target place about which the first emotion information is generated or updated can be controlled by using a predetermined place.

(Configuration 4)

The place information management device according to configuration 3, wherein the predetermined place includes at least one of a place about which the place information is not stored in the place information storage section, a place corresponding to the place information in which an information amount of the first emotion information is equal to or less than a predetermined value, a place corresponding to the place information in which a degree of reliability of the first emotion information is equal to or less than a predetermined value, and a place designated beforehand according to changeability of scenery in the place.

According to configuration 4, the first emotion information can be enhanced about a place for which generation or an update of the first emotion information is required, and accuracy of the first emotion information can be increased.

(Configuration 5)

The place information management device according to any one of configurations 1 to 4, further including a degree-of-matching rating acquisition section that acquires a degree-of-matching rating that is a rating on a degree of suitability, for the shot image, of the piece of music to be reproduced in time to display of the shot image, wherein when the degree-of-matching rating is equal to or more than a predetermined value, the place information generation and update section generates the first emotion information, or updates the first emotion information, about the place corresponding to the shooting position, based on the second emotion information in the music information, and stores the first emotion information in the place information storage section.

According to configuration 5, the first emotion information can be generated or updated by using the second emotion information about the stock music with a high degree of suitability for the shot image.

(Configuration 6)

The place information management device according to any one of configurations 1 to 5, further including a music determination process determination section that determines whether or not the piece of music to be reproduced in time to display of the shot image is a piece of music determined based on the shot image and an instruction from a user of the piece of music, wherein when the piece of music is a piece of music determined based on the instruction from the user, the place information generation and update section generates the first emotion information, or updates the first emotion information, about the place corresponding to the shooting position, based on the second emotion information in the music information, and stores the first emotion information in the place information storage section.

According to configuration 6, the first emotion information about the place corresponding to the shooting position can be generated or updated, based on the second emotion information about the stock music in which an emotion of a human user is reflected.

(Configuration 7)

The place information management device according to configuration 6, wherein the instruction from the user includes at least any one of designation of the piece of music by the user, and agreement of the user about the piece of music that is automatically selected.

According to configuration 7, the second emotion information about the stock music in which an emotion of a human user is largely reflected can be used to generate or update the first emotion information.

(Configuration 8)

The place information management device according to any one of configurations 1 to 7, further including an object determination section that determines an object in the shot image, wherein when a main object in the shot image is not a person, the place information generation and update section generates the first emotion information, or updates the first emotion information, about the place corresponding to the shooting position, based on the second emotion information in the music information, and stores the first emotion information in the place information storage section.

According to configuration 8, the first emotion information can be prevented from being generated or updated based on a piece of music that is not suitable for the place of the shooting position.

(Configuration 9)

A content delivery system including: the place information management device according to any one of configurations 1 to 8; and a content output device that outputs content, wherein the content output device includes a content information storage section that stores beforehand content emotion information about an emotion that can be felt by a person who comes across the content, a position acquisition section that acquires a position of equipment that is an output destination of the content, a place information acquisition section that acquires, from the place information management device, the first emotion information about a place corresponding to the position of the output-destination equipment, and a content selection section that selects the content corresponding to the content emotion information according to the first emotion information acquired by the place information acquisition section, and the content output device outputs the content selected by the content selection section.

According to configuration 9, more suitable content for a place where the output-destination equipment is present can be outputted.

(Configuration 10)

A place information management method for a place information management device including a place information storage section that stores place information in association with a place, the place information being information about the place and including first emotion information about an emotion that can be felt by a person who is present in the place, the place information management method including: by the place information management device, acquiring a shooting position of a shot image shot by a shooting device; acquiring music information that is information on a piece of music to be reproduced in time to display of the shot image, the music information including second emotion information about an emotion that can be felt by a person who listens to the piece of music; and generating the first emotion information, or updating the first emotion information, about a place corresponding to the shooting position, based on the second emotion information in the music information, and storing the first emotion information in the place information storage section.

According to configuration 10, accuracy of the first emotion information about a place can be increased.

REFERENCE SIGNS LIST

2 Place information management system
10 Music delivery server
12, 112 Place information management server (place information management device)
14 Electronic album creation server
21 Delivered-music information storage section (content emotion information storage section)
23 Position acquisition section
24 Place information acquisition section
25 Delivered music selection section (content selection section)
60 Place information storage section
61 Electronic album information acquisition section
62 Object determination section
63 Second degree-of-matching rating acquisition section (degree-of-matching rating acquisition section)

64 Shooting position acquisition section
65 Shooting time information acquisition section
66 Music information acquisition section
67 Place information generation and update section
168 Music determination process determination section
A2 Second user (user)
Da Current position (position of output-destination equipment)
Db2 Stock-music data (music data)
Dc Place information
Dca First emotion information
Dd Electronic album
De Shot image
Df Additional information
Df1 Shooting position
Df2 Shooting time information
Dha Second emotion information (content emotion information)
Di Degree-of-matching rating
Dj Electronic album information
Dn Music information
F Shooting device

What is claimed is:

1. A place information management device comprising:
a place information storage section that stores place information in association with a place, the place information being information about the place and including first emotion information about an emotion that can be felt by a person who is present in the place;
a shooting position acquisition section that acquires a shooting position of a shot image shot by a shooting device;
a music information acquisition section that acquires music information that is information on a piece of music to be reproduced in time to display of the shot image, the music information including second emotion information about an emotion that can be felt by a person who listens to the piece of music; and
a place information generation and update section that generates the first emotion information, or updates the first emotion information, about a place corresponding to the shooting position, based on the second emotion information in the music information, and stores the first emotion information in the place information storage section.

2. The place information management device according to claim 1, further comprising a shooting time information acquisition section that acquires shooting time information including information on at least any one of a date and a time of day when the shot image is shot,
wherein the place information generation and update section classifies the second emotion information, based on the shooting time information, generates the first emotion information, or updates the first emotion information, about the place corresponding to the shooting position, based on the second emotion information after classified, and stores the first emotion information in the place information storage section in association with a time based on the shooting time information.

3. The place information management device according to claim 1, wherein when the place corresponding to the shooting position is a predetermined place, the place information generation and update section generates the first emotion information, or updates the first emotion information, about the place corresponding to the shooting position, based on the second emotion information in the music information, and stores the first emotion information in the place information storage section.

4. The place information management device according to claim 3, wherein the predetermined place includes at least one of a place about which the place information is not stored in the place information storage section, a place corresponding to the place information in which an information amount of the first emotion information is equal to or less than a predetermined value, a place corresponding to the place information in which a degree of reliability of the first emotion information is equal to or less than a predetermined value, and a place designated beforehand according to changeability of scenery in the place.

5. The place information management device according to claim 1, further comprising a degree-of-matching rating acquisition section that acquires a degree-of-matching rating that is a rating on a degree of suitability, for the shot image, of the piece of music to be reproduced in time to display of the shot image,
wherein when the degree-of-matching rating is equal to or more than a predetermined value, the place information generation and update section generates the first emotion information, or updates the first emotion information, about the place corresponding to the shooting position, based on the second emotion information in the music information, and stores the first emotion information in the place information storage section.

6. The place information management device according to claim 1, further comprising a music determination process determination section that determines whether or not the piece of music to be reproduced in time to display of the shot image is a piece of music determined based on the shot image and an instruction from a user of the piece of music,
wherein when the piece of music is a piece of music determined based on the instruction from the user, the place information generation and update section generates the first emotion information, or updates the first emotion information, about the place corresponding to the shooting position, based on the second emotion information in the music information, and stores the first emotion information in the place information storage section.

7. The place information management device according to claim 6, wherein the instruction from the user includes at least any one of designation of the piece of music by the user, and agreement of the user about the piece of music that is automatically selected.

8. The place information management device according to claim 1, further comprising an object determination section that determines an object in the shot image,
wherein when a main object in the shot image is not a person, the place information generation and update section generates the first emotion information, or updates the first emotion information, about the place corresponding to the shooting position, based on the second emotion information in the music information, and stores the first emotion information in the place information storage section.

9. A content delivery system comprising:
the place information management device according to claim 1; and
a content output device that outputs content, wherein the content output device includes
a content information storage section that stores beforehand content emotion information about an emotion that can be felt by a person who comes across the content, a position acquisition section that acquires a position of equipment that is an output destination of the content, a place information acquisition section that acquires, from the place information management device, the first emotion information about a place corresponding to the position of the output-destination equipment, and a content selection section that selects the content corresponding to the content emotion information according to the first emotion information acquired by the place information acquisition section, and the content output device outputs the content selected by the content selection section.

10. A place information management method for a place information management device including a place information storage section that stores place information in association with a place, the place information being information about the place and including first emotion information about an emotion that can be felt by a person who is present in the place, the place information management method comprising:

by the place information management device, acquiring a shooting position of a shot image shot by a shooting device;

acquiring music information that is information on a piece of music to be reproduced in time to display of the shot image, the music information including second emotion information about an emotion that can be felt by a person who listens to the piece of music; and generating the first emotion information, or updating the first emotion information, about a place corresponding to the shooting position, based on the second emotion information in the music information, and storing the first emotion information in the place information storage section.

* * * * *